Figure 1:
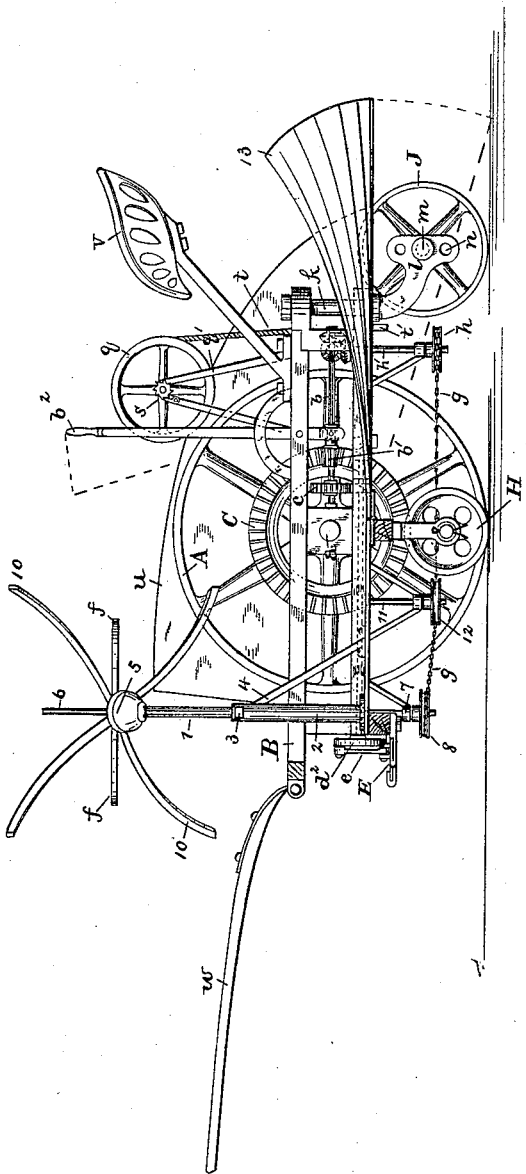

(No Model.) 3 Sheets—Sheet 1.

H. F. URIE.
CORN HARVESTER.

No. 345,195. Patented July 6, 1886.

Witnesses:
Edward A. Osse,
John E. Morris

Inventor
H. F. Urie
By Chas. B. Mann
Attorney.

(No Model.) 3 Sheets—Sheet 2.
H. F. URIE.
CORN HARVESTER.
No. 345,195. Patented July 6, 1886.
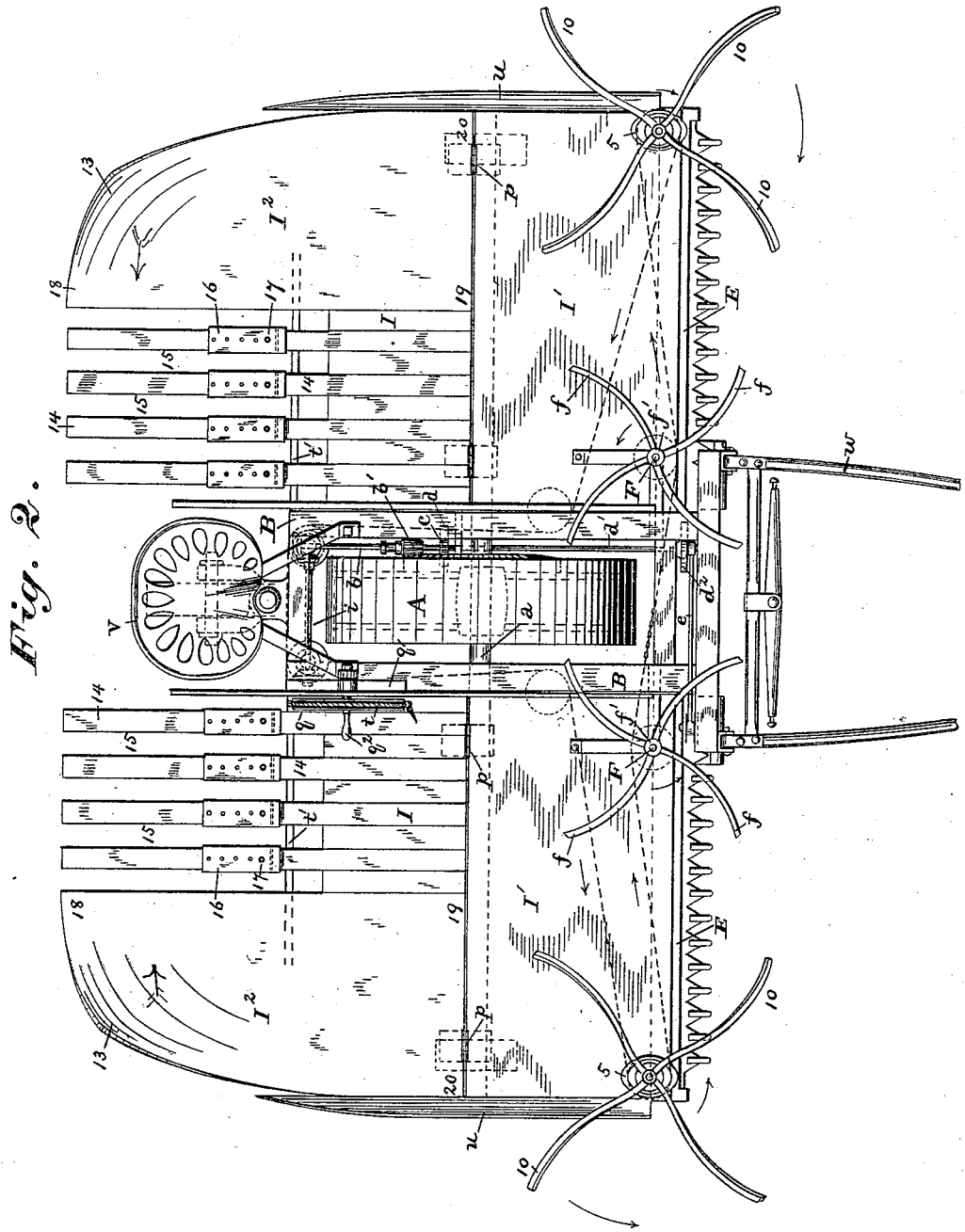
Witnesses:
Edward A. Osse,
John E. Morris.
Inventor.
H. F. Urie
By Chas B. Mann
Attorney (No Model.) 3 Sheets—Sheet 3.
H. F. URIE.
CORN HARVESTER.
No. 345,195. Patented July 6, 1886.
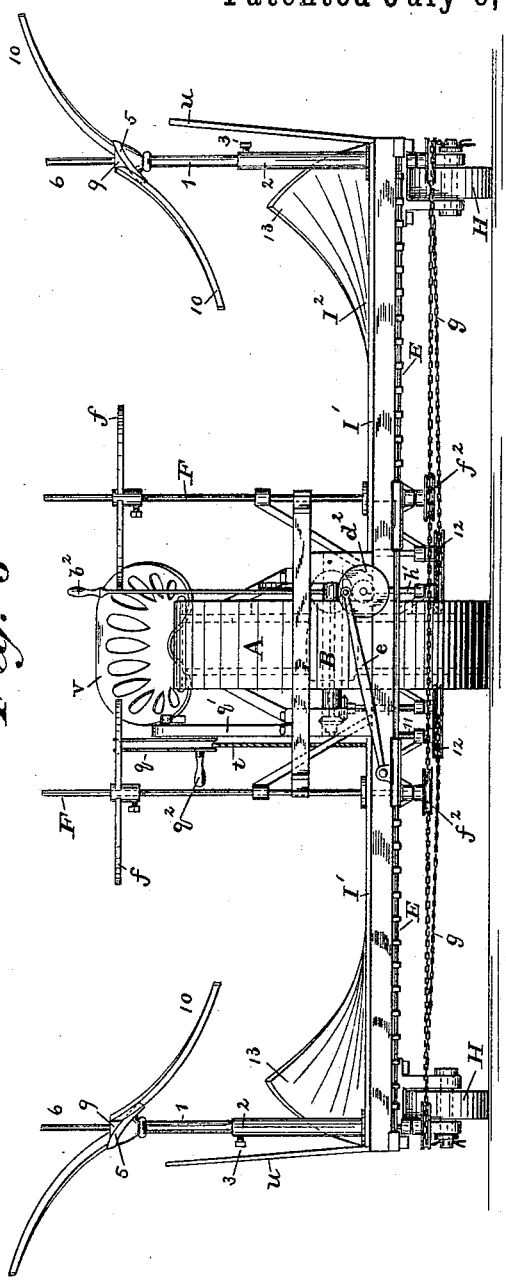
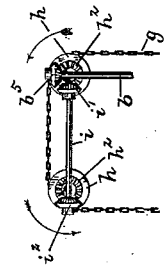
Witnesses:
Edward A. Osse,
John E. Morris
Inventor.
H. F. Urie
By Chas. B. Mann
Attorney.

UNITED STATES PATENT OFFICE.

HENRY F. URIE, OF CHESTERTOWN, MARYLAND.

CORN-HARVESTER.

SPECIFICATION forming part of Letters Patent No. 345,195, dated July 6, 1886.

Application filed July 29, 1885. Serial No. 172,940. (No model.)

*To all whom it may concern:*

Be it known that I, HENRY F. URIE, a citizen of the United States, residing at Chestertown, in the county of Kent and State of Maryland, have invented certain new and useful Improvements in Corn-Harvesters, of which the following is a specification.

My present invention relates to a machine for harvesting corn; and it consists in certain improved parts and combinations of parts, which are herein first described and then claimed.

The invention is illustrated in the accompanying drawings, in which Figure 1 is a side elevation of the machine viewed as though the nearest upright side board were removed for the purpose of better illustration. Fig. 2 is a top plan view of the machine. Fig. 3 is a front elevation of the same. Fig. 4 is a view showing the shafts, bevel-wheels, and chain at the rear lower part of the frame.

The letter A designates the main wheel; $a$, its axle in bearings on the frame B. A cog-wheel, C, is attached to the side of the main wheel. A shaft, $b$, has bearings in the frame, and extends fore and aft, and has a pinion, $b'$, that is adapted to slide by the well-known groove-and-feather device, and thereby gear with the cog-wheel C or disengage from it. A hand-lever, $b^2$, engages with a grooved collar on the sliding pinion $b'$, and comprises the mechanism for shifting it. The shaft $b$ carries gear-wheel $c$, and a small pinion, $d$, on another shaft, $d'$, engages with the said gear-wheel. At the front end of the shaft $d'$ is a crank-head, $d^2$. A pitman-rod, $e$, on the crank-head drives the cutter-bar E with great rapidity. The cutter-bar extends across the front of the machine (see Fig. 2) and projects at both sides of the draft-shafts $w$, by which arrangements the cutter is adapted to cut two rows of standing stalks at once. Two vertical shafts, F, are mounted near the front edge of the stationary floor I', and just back of the cutter-bar. Each has reel-arms $f$, attached to a hub, $f'$, which is adjustable up and down on the shaft. The position of these shafts—one being each side of the frame B—is such that the arms $f$ of one will take effect on the stalks of one row and the arms of the other on the stalks of another row, and as the machine advances these reel-arms serve to press against the standing stalks at a point high up, and thereby throw them back toward the floor and platform of the machine simultaneous with the severing of the stalks by the cutter. The lower end of each reel-shaft F has a chain-pulley, $f^2$, and at the rear lower part of the frame are two vertical shafts, $h'$, each having on its lower end a chain-pulley, $h$. Each of these shafts $h'$ has a bevel-wheel, $h^2$, and the first one is driven by direct engagement with a bevel-wheel, $b^5$, on the rear end of the shaft $b$, and the other one by engagement with a bevel-wheel, $i^2$, on a horizontal shaft, $i$, which also carries another wheel, $i'$, that engages with the bevel-wheel $h^2$ on the said first vertical shaft. An endless chain, $g$, passes over the pulleys $h$ and drives the reels, as hereinafter described. At the outermost corner of each stationary floor I' is a gathering-reel, which operates as hereinafter described. This last-named reel consists of a pipe or tube, 1, which fits telescopically in a lower pipe or tube, 2, while a set-screw, 3, in the latter serves to adjust the upper tube by sliding it up or down, so as to have it at any desired height. The lower tube has a brace, 4, to stay it. The top of the upper tube carries an inclined cam-ring, 5. A shaft, 6, extends vertically through both tubes, and its lower end is below the floor, where it has a bearing, 7, and a chain-pulley, 8. A hub, 9, is vertically adjustable on the reel-shaft 6, and arms 10 are jointed or pivoted to the hub, so as to permit of a vertical movement, and said arms rest on the cam-ring 5. Reel-arms of this kind are employed on rakes in reaper-machines, and embody a construction well understood. The purpose of this reel is to gather or straighten up cornstalks that may be inclining in a direction away from the advancing machine. The reel-arms may have any suitable length, and may also be adjusted to any desired height. At each side of the frame and projecting below is a shaft, 11, which has a chain-pulley, 12, on the lower end. These pulleys serve to change the direction of the endless chain $g$, which drives the reels. The chain $g$ is indicated in Fig. 2 by broken lines. It passes over the two pulleys $h$ at the rear lower part of the frame, and in running takes the direction indicated by the arrows. This one chain therefore drives the reels on the two shafts F, and also the gathering-reels on the shaft 6 at each outermost corner. A small traction-wheel, H, at opposite sides supports each floor I' and the platform I hinged to it. A caster-wheel, J, has its shank $k$ pivoted in the rear end of the frame B. The bifurcated standard $l$, which straddles the wheel J, has holes $n$ arranged in line one above the other. The bolt $m$ is removable and comprises the axle of the wheel, and may be shifted to holes $n$ higher or lower. As the axis $a$ of the main wheel is intermediate of the cutter and caster-wheel, the rear end of the frame may be lowered or raised, which has the effect to raise or lower the cutter-bar E at the front.

The platforms I are of peculiar construction. Each one is connected by hinges $p$ at its front end to one of the stationary floors I', whereby the rear end may tilt down, as indicated by a broken line in Fig. 1. Each platform has a concaved surface or upward-curved part, 13, and a slatted part, 14. The slats 14 project toward the rear and are spaced apart, as at 15. The forward end of each slat is fixed to the platform, and the rear ends are unsupported and not connected together. By this construction the cornstalks may lie partly on the stationary floor I' and on the front part of the platform I, and the top ends of the stalks may drop through the spaces 15 between the slats, and thereby drag on the ground, which assists in discharging them when a load or a bundle of said stalks has accumulated, and when the platform has been tilted. The spaces 15 may be widened by tapering or narrowing the slats toward the end. The slats 14 are also made extensible, whereby they may be adjusted as to length so as to suit the corn, which in some fields is very tall and in others is short. One means for lengthening or shortening the slats is here shown, and consists in making each slat in two pieces, and having a metal socket, 16, fastened to one piece, and then inserting the rear end piece of the slat in the metal socket and securing it by a pin, 17, passed through one of the holes, of which a number are in the socket. Any other suitable construction may be used to shorten or lengthen the slats. The slatted part constitutes about one-half in width of the platform, and this portion comprises a level plane and is next to the main frame. The outer half, $I^2$, of the platform is covered with wood or sheet metal. The upward-curved part, 13, comprises the rear and outermost corner. The rear inner corner, 18, is on the same plane with the front part, 19 and 20. By this construction of platform the cut stalks, which fall on the outer half, $I^2$, will slide sidewise toward the slats and spaces, as indicated by the darts in Fig. 2, and thereby, when a load or a bundle of stalks is discharged by tilting the two platforms, the said stalks from the two platforms will come together on the ground behind the wheel A and constitute one bunch. A pulley, $q$, is mounted on a standard or support, $q'$, and has a crank-handle, $q^2$. A bar, $t'$, passes under the two platforms, and a rope, $t$, attached to the pulley $q$, is made fast to the said bar, and thereby, upon turning the crank-pulley $q$, the platforms may be raised or lowered. A pawl and ratchet, S, (see Fig. 1,) prevents the back movement of the crank-pulley. The stationary floors I' have upright sides $u$, which direct the cornstalks onto the platform.

The seat $v$, for the driver, is at the rear of the frame.

The gathering-reels at the outermost corner of each stationary floor may be removed if the corn to be cut should be standing upright.

Having described my invention, I claim and desire to secure by Letters Patent of the United States—

1. In a corn-harvester, the combination of the main frame B, a stationary floor, I', each side of the main frame, a cutter-bar extending across the frame and in front of the said two floors to cut two rows of stalks, a reel, F, each side of the main frame, having arms $f$ projecting at right angles from the reel-shaft, and a gathering-reel at the outermost corner of each stationary floor, having arms 10, guided by the same ring in an inclined plane, and a chain, $g$, below the said floors, which drives all the reels, as set forth.

2. In a corn-harvester, the combination, with the cutter-bar, of a hinged platform having one portion composed of slats 14, spaced apart to allow the stalks to drop through, and at one side of the slats another portion having a concaved surface formed by curving up one rear corner, as set forth.

3. In a corn-harvester, the combination of a frame, a cutter-bar extending across in front of the main frame to cut two rows of stalks, two hinged platforms—one each side of the main frame—each of said platforms having a portion of its width forming a level plane, and a portion forming a concaved surface by curving upward the rear outermost corner, whereby, when stalks are discharged from the two platforms, they will come together on the ground behind the frame, as set forth.

In testimony whereof I affix my signature in presence of two witnesses.

HENRY F. URIE.

Witnesses:
JOHN E. MORRIS,
JNO. T. MADDOX.